United States Patent [19]
Eguchi

[11] Patent Number: 4,787,094
[45] Date of Patent: Nov. 22, 1988

[54] APPARATUS FOR TRANSMITTING DIGITAL SIGNAL
[75] Inventor: Takeo Eguchi, Kanagawa, Japan
[73] Assignee: Sony Corporation, Tokyo, Japan
[21] Appl. No.: 36,252
[22] Filed: Apr. 9, 1987
[30] Foreign Application Priority Data
Apr. 12, 1986 [JP] Japan .................. 61-084609
[51] Int. Cl.$^4$ .................................... H04B 1/62
[52] U.S. Cl. ......................... 375/60; 178/69 N; 332/37 D
[58] Field of Search ............ 375/4, 34, 58, 60, 122; 358/261; 328/55, 162; 307/265, 266; 332/18, 37 D, 38; 455/114, 116; 178/69 N
[56] References Cited
U.S. PATENT DOCUMENTS
4,096,526 6/1978 Furuta ........................... 358/261
4,101,934 7/1978 Fukuoka ....................... 358/261
4,498,021 2/1985 Uya ................................... 375/4

Primary Examiner—Benedict V. Safourek
Attorney, Agent, or Firm—Philip M. Shaw, Jr.

[57] ABSTRACT

In a digital signal transmission apparatus for transmitting a digital signal through a transmission system of the type which inherently generates nonlinear distortions, the present invention, by means of digital circuits on the transmitting side, allows approximation to a linear transmission system by adding to the signal to be transmitted, compensating distortions, which are formed according to run-lengths of the digital signal and which will cancel the distortions to be produced in the transmission system. The compensating distortion which is added advances the phase of the input digital signal transitions from one logical level to another, succeeding logical level.

3 Claims, 5 Drawing Sheets

APPARATUS FOR TRANSMITTING DIGITAL SIGNAL

BACKGROUND OF THE INVENTION

The present invention relates to an apparatus for transmitting a digital signal.

When a digital signal is transmitted optically or recorded and reproduced magnetically, there are produced nonlinear distortions in the signal transmitted by the relative system. Specifically, in the case of magnetic recording and reproduction, it is known that the waveform of the reproduced digital signal, as the recording density is increased, becomes distorted due to nonlinearity of the recording and reproducing system, restriction by the transmission band of the recording and reproducing system, etc. and therefore the data cannot be reproduced accurately. Such a phenomenon is called a peak shift. The peak shift phenomenon is remarkably observed when the signal waveform is such that the logical levels "0" and "1" alternate therein after the same level of "0" or "1" has lasted long, i.e., after a long time run-length.

As one of the countermeasures to the peak shift phenomenon, a method has been proposed to add a complementary distortion to the recorded digital signal at the recording side in advance, estimating the distortion to be produced in the recording and reproducing system. This compensating method employs an analog phase modulating circuit consisting of a capacitor and a resistor connected to advance the phase of the leading edge in a digital signal following a long run-length.

However, since the above mentioned peak shift compensating method makes use of an analog phase modulating circuit, there are difficult problems in keeping specified conditions against changes in the temperature and fluctuations of the supply voltage and also designing, adjusting or the like of the circuits becomes complex.

On the other hand, there are known methods to suppress the occurrence of the peak shift by modulating a digital signal such that the run-length may be decreased, such as, for example, the PE (phase encoding) method and the M² method. In such modulating methods, however, the volume of the data to be transmitted is increased over that of the original data and their transmission efficiency is lowered.

OBJECT AND SUMMARY OF THE INVENTION

It is accordingly an object of the present invention to provide an apparatus for transmitting a digital signal overcoming the above enumerated difficulties.

Another object of the present invention is to provide an apparatus for transmitting a digital signal in which the occurrence of nonlinear distortion is prevented without using the method of digital modulation.

A further object of the present invention is to provide an apparatus for transmitting a digital signal capable of transmitting increased amounts of data.

Yet another object of the present invention is to provide an apparatus for transmitting a digital signal which can be constructed of digital circuits.

A still further object of the present invention is to provide an apparatus for transmitting a digital signal which is stable against changes in the temperature and fluctuations of the power voltage.

An additional object of the present invention is to provide transmitting for transmitting a digital signal transmitting apparatus which is always capable of setting up the most suitable compensating distortion to be added to the transmitted data at the side of the transmitting system inclusive of the recording system.

Another object of the present invention is to provide an apparatus for transmitting a digital signal suitable for automatic waveform equalization.

In accordance with the present invention which attains the above mentioned objects, there is provided an apparatus for transmitting a digital signal comprising means for receiving an input digital signal having transitions between first and second states, means for detecting run-lengths between the transitions of the input digital signal and for producing a detection signal, and means for controlling phases of the transitions of the input digital signal according to the detection signal.

DETAILED DESCRIPTION OF THE PREFERRED EMBODIMENTS

Figure 1:
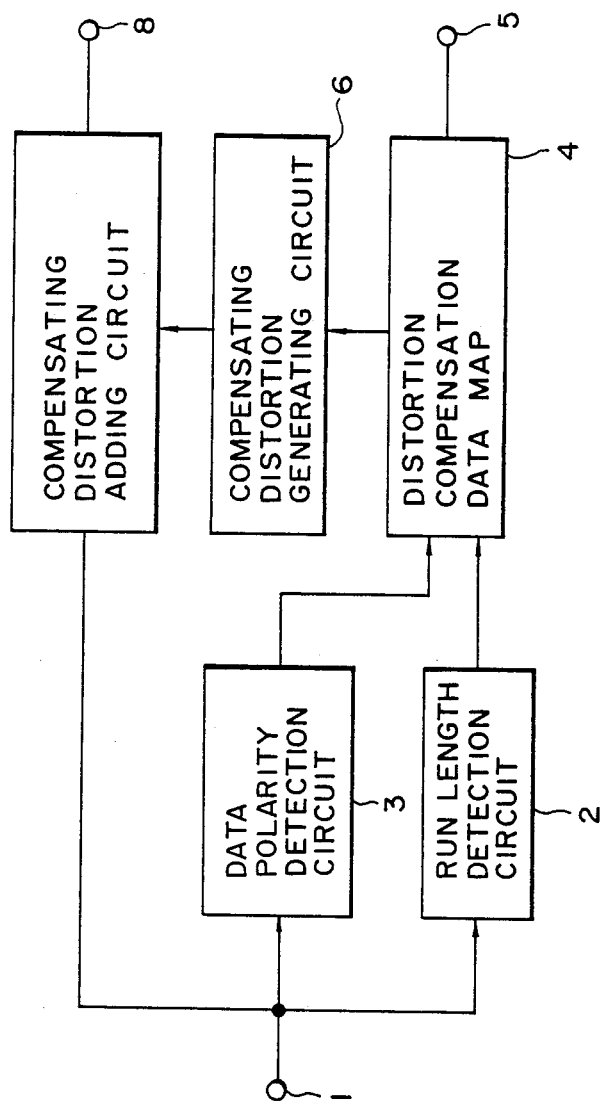
FIG. 1 is a schematic block diagram showing an apparatus for transmitting a digital signal according to an embodiment of the present invention.

An embodiment of an apparatus for transmitting a digital signal to which the present invention is applied will be described below with reference to the accompanying drawings. Referring to FIG. 1, an input digital signal for transmission provided through an input terminal 1 is supplied to a run-length detection circuit 2 and data polarity detection circuit 3. The run-length detection circuit 2 detects the continuing length of the same logical level "0" or "1", i.e., the run-length, in the input digital signal. The data polarity detection circuit 3 detects each of the "0" period and "1" period in the input digital signal. And, in order to compensate a duty distortion which is produced in the recording and reproducing path, although a concrete circuit therefor will be disclosed referring to later discussed another embodiment, the output signal of the run-length detection circuit 2 and the output signal of the data polarity detection circuit 3 are supplied as address signals to a distortion compensation data map 4. The distortion compensation data map 4 is a memory in which data for compensating distortions are stored as a plurality of maps. The data for distortion compensation are digital data necessary for compensating the peak shift and duty distortion. The plurality of maps store, for example, data corresponding to the characteristics of the magnetic tape and characteristics of the magnetic head. The map to be used is selected by a map select signal from an input terminal 5.

The data for distortion compensation read out from the distortion compensation data map 4 is supplied to a compensating distortion generating circuit 6. The compensating distortion generated in the compensating distortion generating circuit 6 is supplied to a compensating distortion adding circuit 7, wherein the compensating distortion is added to the input digital signal. In the present invention, a phase shift is added as the compensating distortion to the input digital signal. Namely, the phase of the edge at the first transition point after one "0" or "1" level which has continued for a duration in the input digital signal is provided with a shift of a predetermined amount. To be more concrete, the compensating distortion is generated by a phase shift in a clock pulse and the phase-shifted clock pulse is supplied to a D flip-flop to which the input digital signal is applied, and the compensating distortion is thereby added to the input digital signal. The digital signal obtained at the output terminal 8 of the compensating distortion adding circuit 7 is supplied, for example, to a recording and reproducing system using rotary heads.

In providing the compensating distortion, amplitude control may also be applied together with the phase shift.

A first embodiment of the present invention described below compensates only for the peak shift, not for the duty distortion.

Figure 2:
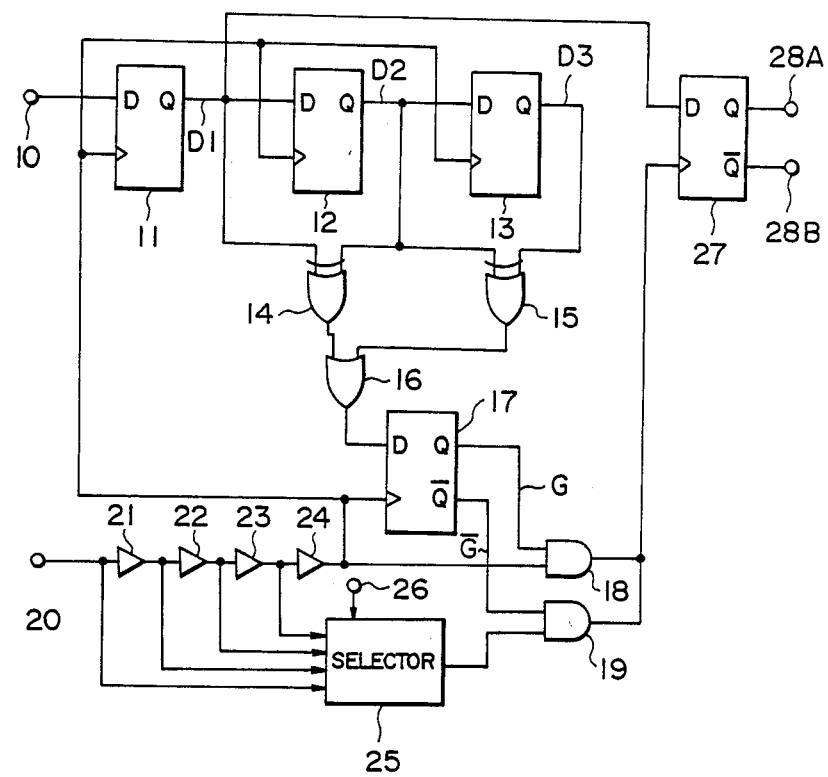
FIG. 2 is a detailed circuit diagram showing an apparatus for transmitting a digital signal according to an embodiment of the present invention.

In an apparatus for transmitting a digital signal according to the first embodiment of the present invention as shown in FIG. 2, it is adapted, when 3 or more bits of the same polarity of "0" or "1" have continued in an input digital signal, the phase of the transition point at the end of the bits is advanced.

Referring to FIG. 2, the input digital signal to be recorded is applied to an input terminal 10. To the input terminal 10 are connected three D flip-flops 11, 12, 13 in series. The output signal D1 of the D flip-flop 11 and output signal D2 of the D flip-flop 12 are supplied to an exclusive OR gate (EX-OR gate) 14, and the output signal D2 of the D flip-flop 12 and output signal D3 of the D flip-flop 13 are supplied to an EX-OR gate 15. Output signals of the EX-OR gates 14 and 15 are supplied to an OR gate 16.

The output signal of the OR gate 16 is supplied to a D flip-flop 17. The output signal G of the D flip-flop 17 is applied to one input terminal of an AND gate 18 and the output signal $\overline{G}$ is supplied to one input terminal of an AND gate 19. On the other hand, a clock pulse is supplied to an input terminal 20 and this input terminal 20 is connected with a series connection of buffers 21, 22, 23, 24. The buffers 21-24 each have a delay amount $\tau$, and so, the clock pulse obtained from the buffer 24 has a delay amount of 4 $\tau$ with respect to the clock pulse supplied to the input terminal 20 and this pulse is supplied to clock terminals of the D flip-flops 11, 12, 13, 17. The clock pulse from the buffer 24 is supplied to the other input terminal of the AND gate 18 and a clock pulse, selected from the input clock pulse and the clock pulses obtained at the output terminals of the buffers 21, 22, 23 through a selector 25, is supplied to the other input terminal of the AND gate 19. The selector 25 is supplied with a select signal from a terminal 26. The select signal is generated, for example, by the operation of a manual switch.

The output signals of the AND gates 18 and 19 are supplied through a wired OR gate to the clock terminal of a D flip-flop 27 as the clock pulse therefor. The D flip-flop 27 is supplied with the output signal D1 from the D flip-flop 11. From the output terminals 28A, 28B of the D flip-flop 27, output digital signals with compensating distortions added thereto are taken out.

Figure 3:
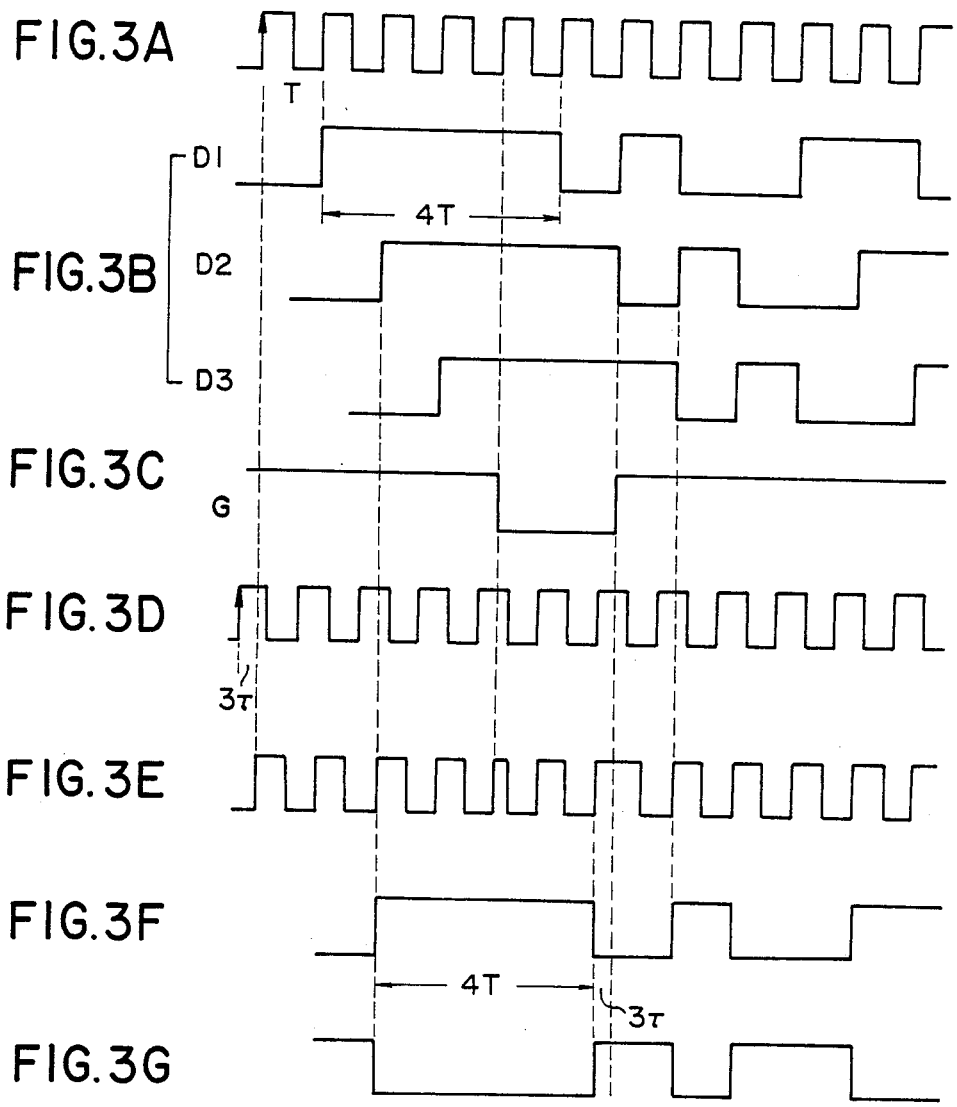
FIGS. 3A–3G form a time chart useful for explaining the operations of the circuit shown in FIG. 2.

The operations of the first embodiment structured as above will be described below with reference to the time chart shown in FIGS. 3A to 3G. The input digital signal applied to the input terminal 10 has a waveform in which, for example, a "1" level continuing for the period of 4T, i.e., a run-length of 4T, is followed in turn by a "0" for 1T, "1" for 1T, "0" for 2T, and "1" for 2T. FIG. 3A indicates the clock pulse whose period is T output from the buffer 24, and in synchronism with this clock pulse, the digital signals D1-D3 indicated in FIG. 3B are output from the D flip-flops 11-13, respectively.

The EX-OR gates 14, 15 and OR gate 16 detect a run-length whose duration is 3T or longer using the digital signals D1-D3. Through sampling the output signal from the OR gate 16 according to the clock pulse (FIG. 3A), the detection signal G as indicated in FIG. 3C is obtained from the D flip-flop 17.

The selector 25 selects, for example, the clock pulse output from the buffer 21, whereby the clock pulse as indicated in FIG. 3D whose phase is advanced by 3 $\tau$ from the original clock pulse is obtained. Since the AND gate 19 allows the clock pulse from the selector 25 to pass therethrough during the period when the detection signal G is "0", the OR output from the AND gates 18 and 19 becomes as indicated in FIG. 3E. This clock pulse indicated in FIG. 3E is supplied to the D flip-flop 27, and the digital signal D1 is sampled in this D flip-flop 27. Therefore, from the output terminal 28A of the D flip-flop 27 is obtained the digital signal as indicated in FIG. 3F, in which the phase of the edge at the timing of the trailing edge of the 4T run-length is advanced by 3 $\tau$. And, the phases of the edges following the phase compensated edge remain the same as in the original signal until a run-length whose period is 3T or longer is detected again.

When a "0" level continues for a 3T-period or longer, for example, for a 4T-period in the present case, the phase of the edge where "0" is inverted to "1" is likewise advanced as indicated in FIG. 3G. The phase compensation amount is not limited to 3 $\tau$ but the most suitable one for the recording and reproducing system in use is selected from $\tau$, 2 $\tau$, 3 $\tau$, and 4 $\tau$ by the selector 25.

Figure 4:
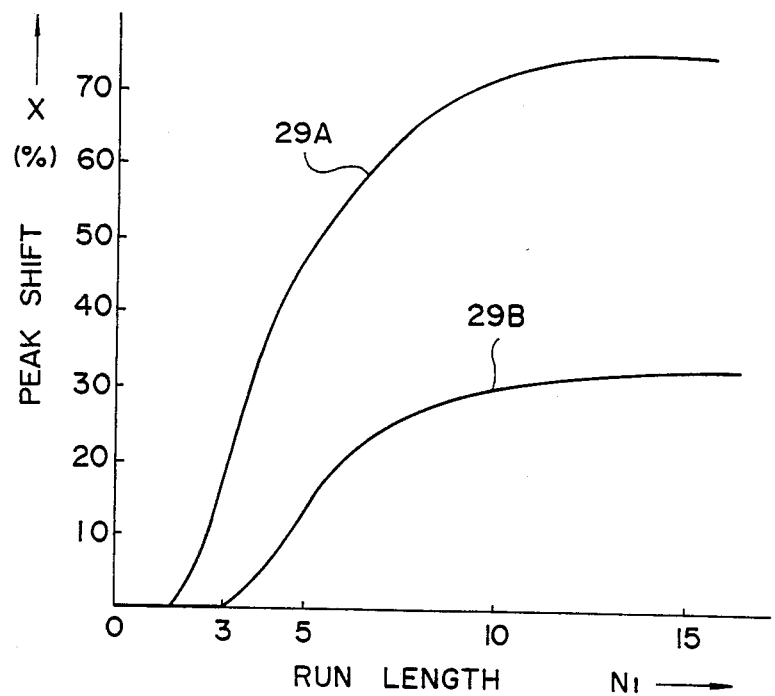
FIG. 4 is a characteristic diagram useful for explaining the effect of an embodiment of the present invention.
Figure 5A:
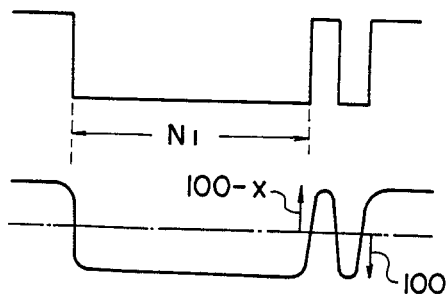
FIG. 5 is a waveform diagram useful for explaining the effect of an embodiment of the present invention.
Figure 5B:
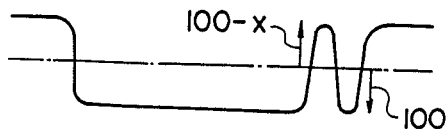

The effect of the improvement of the peak shift obtained from the above first embodiment of the invention will be described with reference to FIG. 4 in the following. FIG. 4 shows an example of measurement values expressed with numbers of bits N1 of run-lengths taken along the axis of abscissa and the peak shift amounts x taken along the axis of ordinate. The peak shift amount x is defined as described in FIGS. 5A and 5B. The digital signal with a run-length of N1 bits as indicated in FIG. 5A is recorded in a magnetic tape by means of a digital signal recording and reproducing apparatus of a rotary head type, and the reproduced digital signal with the waveform as indicated in FIG. 5B is observed through a reproduced waveform equalizer. In FIG. 5B, the level above the central level which is indicated by a one-dot chain line is represented by (100−x) % and the level below the central level is represented by 100%, and thus, the amount of x % is measured.

In FIG. 4, the curve 29A represents the peak shift amounts when no compensation was made, in which increase of N1 is observed to cause nonlinear increase of the peak shift amount x in the region where N1 is over 2 bits. The curve 29B indicates changes in the peak shift amount x when the present embodiment of the invention was applied, in which it is observed that x=0 when N1=3 bits, and even in the region where N1 is larger than 3 bits, the peak shift amount x is smaller than that in the case where no compensation was made.

In the above described embodiment, it is arranged such that a preset amount of phase lead is provided when the length of the run-length is 3 or more bits. However, since the peak shift amount varies with the run-lengths, the embodiment cannot completely suppress the occurrence of the peak shift amount except when the run-length is 3 bits. In view of this, another embodiment of the invention as described below is designed to suppress the peak shift well enough.

Figure 6:
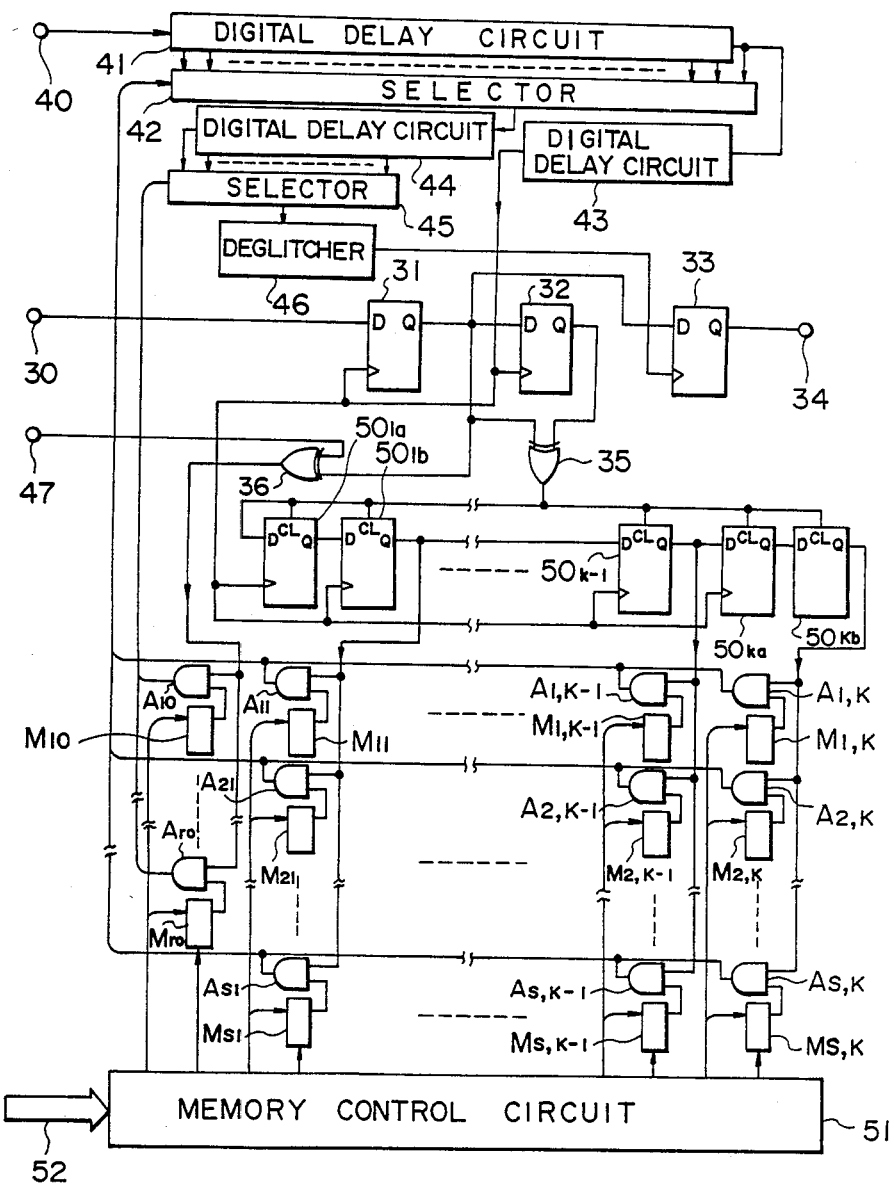
FIG. 6 is a detailed circuit diagram showing an apparatus for transmitting a digital signal according to another embodiment of the present invention

Referring to FIG. 6, an input digital signal to be recorded is supplied from an input terminal 30 and a clock pulse is supplied from an input terminal 40. The input digital signal is supplied to a D flip-flop 31. The output signal from the D flip-flop 31 is supplied to flip-flops 32 and 33. The output signal of the D flip-flop 33 is taken out from an output terminal 34.

The clock pulse from the input terminal 40 is supplied to a digital delay circuit 41 having n taps. The digital delay circuit 41 is structured of n stages of ECL buffers connected in series. While the output signal from each tap of the digital delay circuit 41 is supplied to a selector 42, the output signal from the last stage of the digital delay circuit 41 is supplied to a digital delay circuit 43. The clock pulse which has been delayed a predetermined amount by the digital delay circuit 43 becomes the clock pulse in the reference phase free from any phase control. The selector 42 selects the clock pulse output from the tap designated by a later discussed selector signal for peak-shift compensation. The clock pulse selected by the selector 42 is supplied to a digital delay circuit 44 provided with p taps. The output from each tap of the digital delay circuit 44 is supplied to a selector 45. The selector 45 selects the clock pulse output from the tap designated by a later discussed select signal for duty-distortion compensation. The clock pulse from the selector 45 is supplied to a deglitcher 46. The deglitcher 46 is provided for removing spiky, or whiskery, waveforms caused by delay in the circuit elements. The clock pulse for compensation is obtained from the deglitcher 46.

The D flip-flops 31 and 32 are supplied with the reference clock pulse from the digital delay circuit 43. On the other hand, the D flip-flop 33 from which the output digital signal is taken out is supplied with the clock pulse for compensation from the deglitcher 46. The output signal from the D flip-flop 31 and output signal from the D flip-flop 32 are supplied to an EX-OR gate 35. The output signal from the EX-OR gate 35 is supplied to the data input terminal of a D flip-flop 50*l*a. The D flip-flop 50*l*a is connected in series with k pieces of D flip-flops 50*l*b, 502, . . . , 50k−1, 50ka and the D flip-flop 50ka is connected in series with a latch 50kb.

The clock input terminals of the D flip-flops 50*l*a–50ka are commonly supplied with the reference clock pulse and the clear input terminals of the D flip-flops 50*l*a–50ka and the latch 50kb are commonly supplied with the output signal from the EX-OR gate 35. A run length detection circuit is formed of the D flip-flops 31, 32, EX-OR gate 35, D flip-flops 50*l*a–50ka, and the latch 50kb. When a run-length of 2 or more bits is contained in the input digital signal, the output signal from the EX-OR gate 35 becomes "1" only at the clock timing corresponding to the run-length. And, when "0" and "1" alternately appear each in one bit, the D flip-flops 50*l*a–50ka and the latch 50kb are cleared. Out of the (k−1) pieces of the D flip-flops 50*l*b–50k−1, which form a shift register, the one corresponding to the length of the run-length holds the output signal "1" at its output terminal. Therefore, in the present embodiment of the invention, each of 2, 3, . . . , k bits in connection with the run-length can be detected. And, if a run-length more than (k+1) bits is contained, the output signal of the latch 50kb becomes "1".

The selector 42 is supplied with the select signal of s bits for the peak shift compensation. By this select signal, the phase shift necessary for the peak shift compensation is given to the clock pulse. And, the selector 45 is supplied with the select signal of r bits for duty-distortion compensation. The duty distortion is such a phenomenon that, when a digital signal whose duty ratio, for example, is 50% has been recorded, the duty ratio of the reproduced digital signal deviates from 50%. The duty distortion is produced due to unbalanced recording circuit, unbalance head windings, etc. The compensation for the duty distortion is such that will make either "1" period or "0" period in an input digital signal narrower or wider. The compensation amount is determined by the select signal for duty-distortion compensation.

The select signal for duty-distortion compensation is stored in memories M10, M20, . . . , Mr0, each thereof being of one bit. The select signal, formed of r bits read out from each of the memories M10, M20, . . . , Mr0, is supplied to the selector 45 through AND gates A10–Ar0. The digital signal obtained at the output of the D flip-flop 31 is supplied, through an EX-OR gate 36, commonly to the AND gates A10–Ar0. Therefore, during the period when the output signal of the EX-OR gate 36 is "1", the select signal stored in the memories M10–Mr0 is supplied to the selector 45, and during the period when the output of the EX-OR gate 36 is "0", all the bits of the select signal become "0". The EX-OR gate 36 is supplied with a polarity control signal from an input 47, whereby control is made as to which of "0" period and "1" period is to be subjected to the pulse width compensation.

Each of the select signals of s bits for peak-shift compensation is stored in memories provided corresponding to each of run-lengths. In memories Ml1–Ms1 each thereof being of one bit, there is stored the select signal producing the most suitable phase shift when the run-length is two bits. Likewise, the select signals causing the most suitable phase shifts when the run-lengths are three bits, four bits, . . . are stored in respective memories. In memories Ml,k−1–Ms,k−1, there is stored the select signal producing the most suitable phase shift for the run-length of k bits, and the select signal for the run-lengths of (k+1) bits and above is stored in memories Ml,k–Ms,k.

The select signals for peak-shift compensation are read out from the memories and supplied through AND gates provided corresponding to each of the memories to the selector 42. The AND gates are shown with reference characters assigned thereto, Aij, which correspond to those for the memories, Mij. As the common input signal to each set of the s pieces of AND gates, each of the output signals from the D flip-flops 50*l*b–50k−1 and the latch 50kb is supplied.

The above mentioned memories M10–Mr0 storing the select signal for duty-distortion compensation and memories Ml1–Ms,k storing the select signals for peak shift compensation are controlled by a memory control circuit 51.

The memory control circuit 51 receives select signal data 52 to be written in memories from data storage portions of such as PROM and EPROM. The select signal data are written in the memories corresponding to the addresses to be generated by the memory control circuit 51. The address signal and write/read control signal for the related set of memories of r pieces or s pieces are supplied from the memory control circuit 51. The select signal data are such as are in correspondence with the kinds of the magnetic tapes used, characteristics of the magnetic heads, etc.

According to the above described second embodiment, it is enabled to provide the digital data for recording with the most suitable compensating distortion (phase shift) corresponding to the length of the run-length thereby to suppress the peak shift amount well enough and also to make compensation for the duty distortion.

In providing the compensating distortions corresponding to the run-lengths, it may be arranged such that different amounts of compensating distortions may be generated for each of a series of run-lengths with an increment of plurality bits, instead of generating for each of those with the increment of one bit.

It is also possible to practice such automatic equalization wherein the waveform in the reproduced signal is analyzed to obtain the most suitable compensating distortion to be given to the recording side and this compensating distortion is fed back to the recording side.

Further, the present invention is applicable not only to a digital VTR but also to a transmission system which causes nonlinear distortions.

According to the present invention, by adding to a digital signal such compensating distortions that will cancel nonlinear distortions to be produced in a transmission system, it is enabled to approximate the transmission system to a linear system. Therefore, the occurrence of a peak shift can be suppressed without lowering the transmission efficiency as is the case with digital modulation. Especially, because the compensating distortions are produced by a digital circuit in the present invention, stabilized functioning is assured against changes in the temperature and fluctuations of the power voltage. Besides, the present invention is capable of providing the most suitable compensating distortions corresponding to the run lengths in the digital signal.

What is claimed is:

1. An apparatus for transmitting digital signals comprising:
   a. means for receiving an input digital signal having level transitions between first and second states in a predetermined phase;
   b. run length detecting means for detecting each run length of at least a predetermined length between the transitions of the input digital signal and for producing a first detection signal corresponding to each such run length; and
   c. means for controlling the positions of the transitions of the input digital signal with respect to the predetermined phase according to the detection signal.

2. A transmitting apparatus according to claim 1, wherein said means for controlling the positions of the transitions includes:
   a. means for generating a sampling clock signal;
   b. means for latching the input digital signal in synchronism with the sampling clock signal; and
   c. means for advancing the phase of the sampling clock signal to match the phase of the input digital signal according to the run length of the first state.

3. An apparatus for transmitting digital signals comprising:
   a. means for receiving an input digital signal having transitions between first and second states;
   b. run length detecting means for detecting each run length exceeding a predetermined value between the transitions of the input digital signal and for producing a first detection signal corresponding to each such length;
   c. polarity detecting means for detecting the polarity of the input digital signal and for producing a second detection signal corresponding to the polarity of the input digital signal;
   d. distortion compensating data generating means supplied with the first and second detecting signals for generating distortion compensating data according to the first detecting signal from the run length detecting means and the second detecting signal from said polarity detecting means;
   e. compensating distortion signal generating means supplied with the distortion compensating data for generating a compensating distortion signal having a compensating distortion component according to the distortion compensating data from said distortion compensating data generating means; and
   f. compensating distortion component to the input digital signal.

* * * * *